Sept. 15, 1936.   E. D. DOYLE   2,054,121
SYSTEM OF DISTRIBUTION
Filed Sept. 12, 1923   4 Sheets—Sheet 1

Sept. 15, 1936. E. D. DOYLE 2,054,121
SYSTEM OF DISTRIBUTION
Filed Sept. 12, 1923 4 Sheets-Sheet 2

Patented Sept. 15, 1936

2,054,121

UNITED STATES PATENT OFFICE 2,054,121

SYSTEM OF DISTRIBUTION

Edgar D. Doyle, Philadelphia, Pa., assignor to Leeds & Northrup Company, Philadelphia, Pa., a corporation of Pennsylvania Application September 12, 1928, Serial No. 305,597

31 Claims. (Cl. 290—4)

My invention relates to systems for controlling the distribution, as of load, between several units, adapted, for example, to deliver energy to a common, energy-consuming system; specifically, between several generating units delivering electrical energy to a common line or network.

In accordance with my invention, individual units are controlled to maintain a desired group load and/or a desired relation between the individual units of the group.

More specifically, in accordance with my invention, to maintain the operating efficiency of a group of two or more of the units at a maximum, there is produced, preferably by energy supplied, by each unit of the group, an effect, as an electrical effect, whose magnitude is representative of the relative rate of change of input and output of the unit and the effects are caused to coact to effect operation of the units of the group at points or regions of their respective input-output or equivalent curves, having the same slope, preferably by varying the magnitude of energy supplied to the units.

Further in accordance with my invention, a condition of the energy-consuming system is utilized to determine the magnitude of energy delivered to or by one of the units, which may be termed a master unit, and the other unit or units of the group are controlled as above described to operate on portions of their input-output curves having the same slope as that of the first or master unit.

Further in accordance with my invention, and more specifically, two or more groups of as electric generating units, deliver power to a common load, specifically a common circuit or electrical network, and the master unit of at least one group maintains constant the amount of power delivered by the group under different and varying conditions of total load or demand while another unit, as the master unit of another group, maintains substantially constant the frequency of an alternating current circuit comprised in the network.

My invention resides in a method and system of the character hereinafter described and claimed.

For an illustration of some of the forms my invention may take, and some of the systems to which it may be applied, reference is to be had to the accompanying drawings in which.

Figure 1:
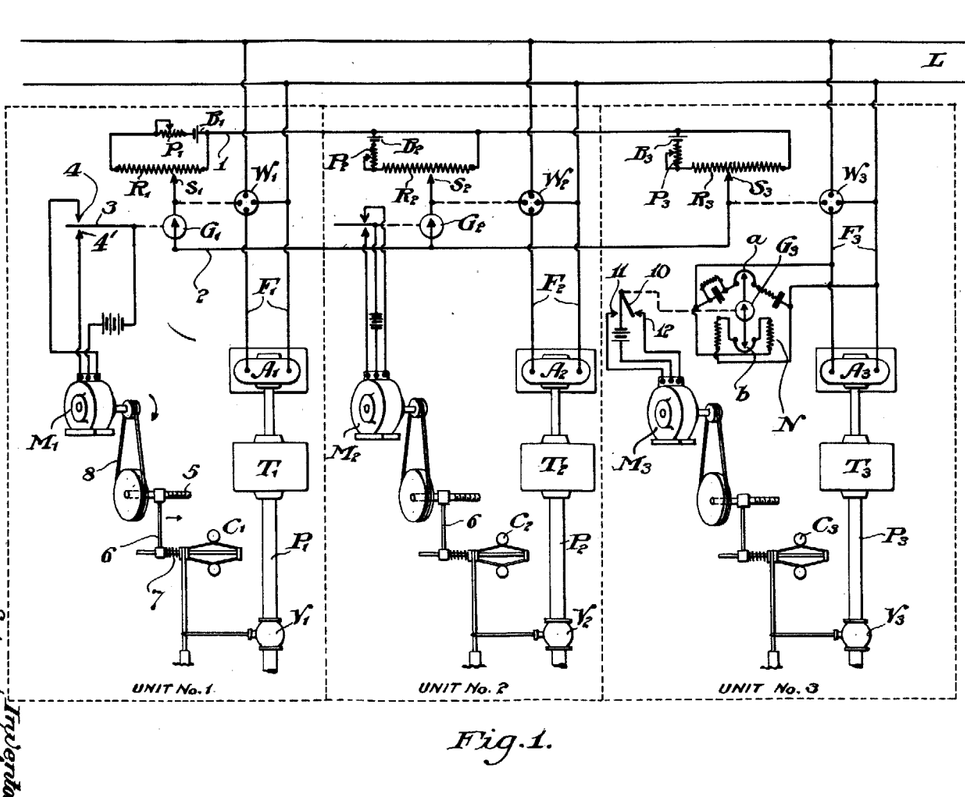
Figs. 1 and 2 are diagrammatic views of an electrical system embodying my invention.

Referring to Fig. 1 of the drawings, unit #1 within the left-hand dotted enclosure comprises apparatus for generating and delivering electrical energy to a line L and includes in the example shown, a suitable prime mover, as a turbine T1, the motive power of which, steam, for instance, is controlled by the position of the valve V1. A governor mechanism C1 driven by the turbine T1, through suitable mechanical connections, varies the position of the valve V1 to maintain the speed of the turbine and of the alternator A1 driven thereby substantially constant for any given setting of the governor. To the movable structure or element of a watt meter W1 connected to the feeder circuit F1 of alternator A1, is mechanically connected a contact S1 movable or slidable along a resistance R1 connected across a battery B1. The magnitude of current flowing through the resistance R1 and therefore the potential of any and all points thereof with respect to the conductor 1, for example, may be adjusted to a suitable value by variation of resistance P1. Thus far described, as the load upon the generator or alternator A1 varies, for each magnitude of load, there is a predetermined, definite position of contact S1 and uniquely determined potential between contact S1 and conductor 1.

Unit #2 of Fig. 1 is or may be generally similar to unit #1 although the elements thereof may be of different characteristics, ratings, etc. The speed of prime mover T2 which drives alternator A2 is determined and controlled by governor mechanism C2 suitably associated with the movable element of valve V2. The position of contact S2 along resistance R2 is determined by the position of movable structure of watt meter W2 to which it is connected. An adjustable resistance P2 is provided to permit flow of a desired magnitude of current through resistance R2. For each position of contact S2 as determined by the load upon alternator A2, there is a predetermined difference of potential between contact S2 and conductor 1 which connects terminals of like polarity, of resistances R1, R2, and others subsequently referred to.

There is included in circuit with conductor 2 between contacts S1 and S2, one or more instruments, as galvanometers G1 and G2, or equivalent, adapted to control the direction of rotation and time of energization of associated motors M1 and M2, respectively, which through suitable speed-reduction mechanism change the settings of governors C1 and C2. For example, if the potential of contact S2 is higher than that of contact S1, current flows through galvanometer G1 in a direction effecting movement of switch arm 3, by mechanism hereinafter described, into engagement with contact 4 to effect rotation of the armature of motor M1. A shaft 5 threadably engaged by a nut end of an arm 6 whose position determines the tension of governor spring 7 is driven by the rotor of motor M1, as through belt 8, or equivalent and rotated in a direction increasing the tension of the spring 7, thereby changing the governor setting in a sense effecting greater opening of valve V1 and increase in speed of turbine T1 and alternator A1. As the latter takes on more load, the position of contact S1 changes until there is no difference of potential between contacts S2 and S1 whereupon the movable structure of galvanometer G1 returns to its normal position, and breaks the circuit of motor M1 through contact arm 3. The governor setting remains at its new value until there is again a difference of potential between contacts S1 and S2. To shorten the period in which equilibrium is obtained, the second galvanometer G2 is included in series with galvanometer G1 and is so connected or wound as to be deflected in an opposite sense, or if deflected in the same sense the connections between motor M2 and the switching mechanism controlled by the galvanometer is such that as the setting of the governor of unit #1 is being changed to increase the speed of turbine T1, the setting of the governor of unit #2 is being simultaneously changed to decrease the speed of turbine T2.

Figures 3, 5:
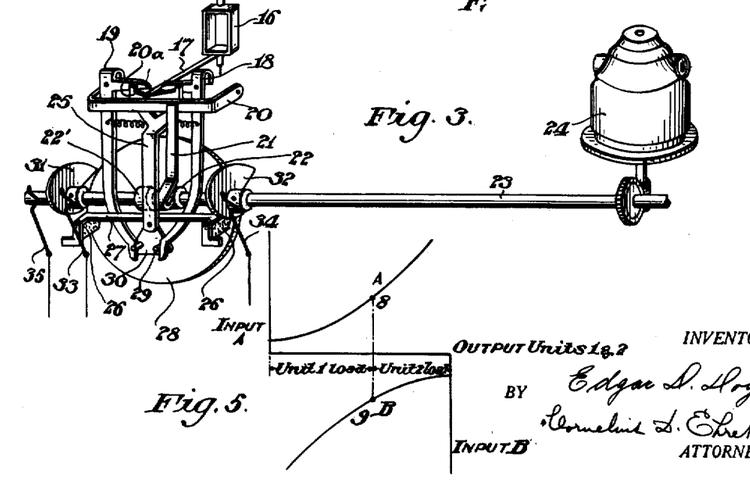
Fig. 3 is a perspective view of control mechanism utilizable in my invention.
Fig. 5 discloses curves referred to in explanation of my invention.

As the load changes from one value to a new value, the governor settings of the units are automatically changed as above described to effect desired distribution of the total load between them. Referring to Fig. 5, the curve A represents, for example, the input-output curve of unit #1, and curve B represents the same curve of unit #2. For any given total load of units 1 and 2, the maximum group efficiency is obtained when the units are operating at points on their input-output curves having the same slope, that is the same relative rates of change of input and output. If it be assumed that the input-output curves of the units are of the shape shown and that points 8 and 9 of curves A and B, respectively have the same slope, it is apparent that if input of unit #2 is decreased the input of unit #1 would have to be increased by a greater amount, increasing the total input of the units for the same output. Conversely, if input of unit #1 is decreased then the input of unit #2 would have to be increased by a greater amount to maintain the same output of the group of two machines.

The resistances R1, R2, and similar resistances, if more than two units are comprised in the group, are each graded to follow the slope-output curve of the particular machine with which they are associated, that is, in accordance with the ratio of a small change in input to the corresponding change in output, throughout the range of variation of input. As the positions of contacts S1, S2, etc. are determined by the output of the several machines, the potentials thereof are representative of the slope of the input-output curves at the points of operation. When the machines are operating at points of their input-output curves having the same slope, the contacts S1, S2 are at the same potential. Upon occurrence of any change which disturbs that relation, there is produced a potential difference between the contacts which is utilized as above described to control operation of one or more of the units to reestablish balance of the potentials and operation of the units at points of their input-output curves having the same slope.

Figures 1A, 6:
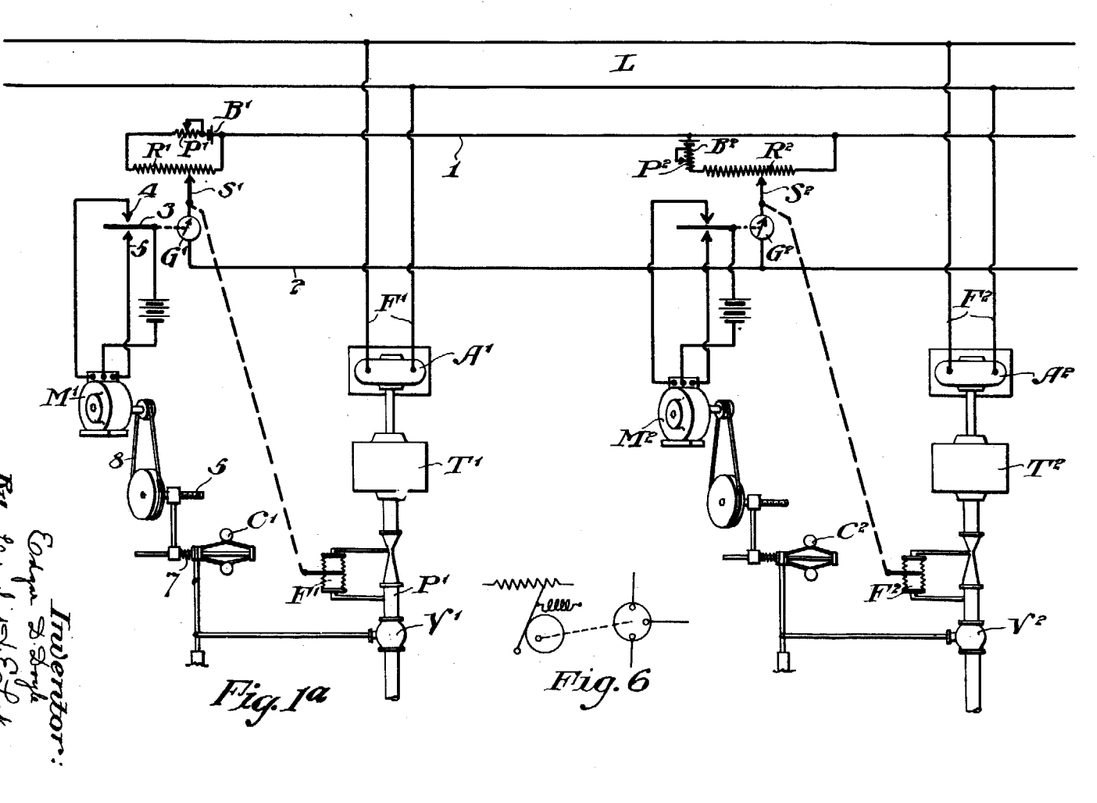
Fig. 1a discloses diagrammatically, a further modification.
Fig. 6 illustrates, diagrammatically, a modified form of resistance varying arrangement.

Alternatively, the resistances R1, R2, etc. may each be graded to follow the slope-input curve of its associated generating, or equivalent, unit in which event the positions of contacts S1, S2, etc. are determined by the inputs of the respective units, that is, in accordance with the ratio of a small change in output to the corresponding change in input. The contacts could be moved, Fig. 1a for example, by the movable structures of flow-meters F1, F2, etc. connected to pipes P1, P2, etc. between the turbines T1, T2 and the controlled valves V1, V2.

The resistances R1, R2 need not be of varying resistance for equal increments of length if there be interposed suitable motion-translating mechanism (Fig. 6) between contacts S1, S2, and the movable contact-actuating structures of watt meters W1, W2 to effect for all positions of the contacts, respective potentials representative of the slopes of the input-output curves, of the units at their points of operation.

The number of units may be increased to any desired number to attain the same result, that is maximum group efficiency, by connecting between the control circuit conductors 1 and 2, for each unit a potentiometer arrangement as above described. The resulting arrangement is flexible in that the generating units may be cut in and out of operation, for any reason or purpose, without change or replacement of any of the elements comprising the control or potentiometer circuit, or the control mechanism of the units remaining in service. For example, if one of three or more alternators are disconnected from the line L, the electrical load previously carried by all is automatically redistributed among the remaining alternators and in a manner effecting maximum efficiency of the new group of generating units under the new conditions of individual unit load.

The several turbines may be supplied from a common source, as a bank of one or more boilers, or from individual sources, in which latter case the potentiometer resistances may be graded to take into consideration the characteristic of the boilers associated with the respective units. Further the units may be remote from each other, rather than in the same power plant structure or site, in which event "input" as a component of the input-output curve may be considered as the cost of fuel, etc. for the boilers, and/or "output" as the power, or price of power, at the point of consumption.

Referring again to Fig. 1, there is associated with unit #3 suitable control mechanism for maintaining substantially constant the speed of alternator A3, which may be, for example, of the character disclosed in Wunsch application Serial No. 18,794, filed March 27, 1925. A network N, specifically a Wheatstone bridge in form, is connected across the feeders F3 from alternator A3. Upon departure of the frequency from a desired value, there exists between points a and b a difference of potential causing deflection of galvanometer G3, the movable structure of which is associated with the movable switch member 10, adapted to engage fixed contact 11 or 12 depending upon the sense of change of frequency. For example, upon decrease of frequency, as for instance by increase of load upon line L, galvanometer G3, or equivalent, causes switch arm 10 to engage fixed contact 11, energizing motor M3 to effect through mechanism generally similar to that previously described in connection with units 1 and 2, change in setting of governor C3 to increase the energy delivered to turbine T3, and consequently, to increase the speed of alternator A3.

The watt meter W3 included in the feeder circuit F3 is responsive to the increase in load on alternator A3 and through suitable mechanical connections shifts the contact S3 along potentiometer resistance R3 to a position at which its potential is representative of the slope of the input-output curve of unit 3 at its point of operation under the increased load. The galvanometers G1 and G2 deflect in senses determined by the relative potentials of contacts S1 and S2 with respect to S3 and to each other to effect operation of units 1 and 2 at points of their input-output curves having the same slope as that of the master, frequency-controlled unit #3. As a result, the line frequency, and hence the speed of the alternators is maintained substantially constant for varying conditions, as of load, and additionally the efficiency of the group of generating units including the frequency-controlled or master unit, is maintained substantially at a maximum. This modification is specifically claimed in my co-pending application Serial No. 571,519, filed October 28, 1931.

Figure 2:
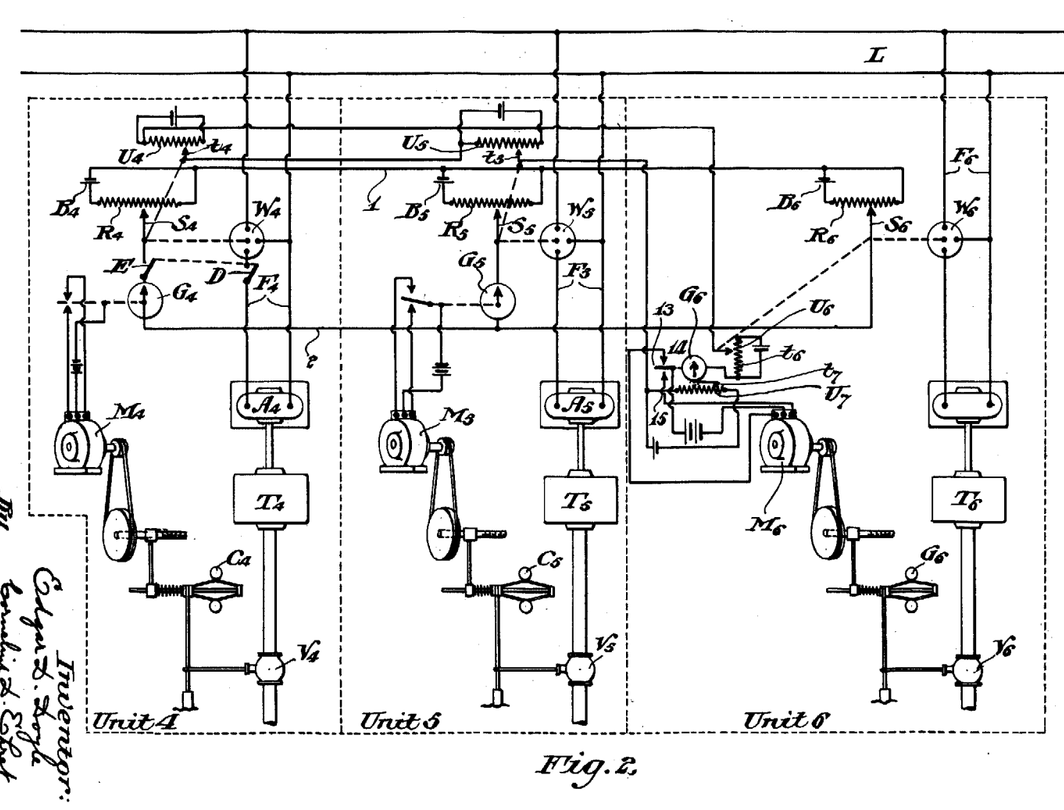

Referring to Fig. 2, the watt meters W4, W5 and W6 included in the output feeder circuits F4, F5, and F6 of alternators A4, A5, and A6 respectively, of units 4, 5 and 6 not only determine the position of contacts S4, S5, S6 along the slope input resistances R4, R5 and R6 as in units 1 and 2 of Fig. 1 but also are effective to move contacts t4, t5 and t6 along the uniform, resistances U4, U5, and U6 to vary the portions thereof included in series in a "totalizing circuit". Preferably a battery or equivalent, is connected across the whole of each resistance and if desired, any suitable means not shown may be used to determine the local battery current through the individual resistances. The potential drop across the portion of each individual resistance effectively included in the "totalizing" circuit as determined by the position of the watt meter actuated contact is representative of the load on the particular unit with which it is associated. The total of the potential drop across resistances U4, U5 and U6 representative of the total or group load is balanced against a drop in potential along resistance U7, whose magnitude is manually adjustable, as by movement of contact t7. When total load, or sum of the loads on the individual units is a desired value, the current through galvanometer G6 due to the drop of potential through resistance U7 is equal and opposite to that resulting in the totalizing circuit from the summation of potential across resistances U4, U5 and U6. Change in the total load, as occasioned, for example, by change in the system demand inherently changes the loads on all of the individual machines which through watt meters W4, W5 and W6, effects movement of contacts t4, t5, t6, to provide a flow of currents through galvanometer G6 which deflects in a sense determined by the sense of change in total load. Accordingly, switch member 13 actuated by the galvanometer G6 engages either of fixed contacts 14, 15 to energize motor M6, and, in a manner above described, thereby change the setting of governor G6. It will be understood that any or all of the turbines T1 to T6 may be controlled by actuating the input flow valve directly by the motor instead of indirectly by change of the governor setting, which is the preferred method.

The speed of turbine T6 is changed in a sense opposite to the sense of change of load, for example, if the total load of the group tends to increase, the speed of turbine T6 and alternator A6 is decreased to reduce the load upon that unit which is the master unit of the group. The watt meter W6 changes the position of contact S6 along the slope-output graded resistance R6 whereupon the galvanometers G4 and G5 are effective in a manner above described in connection with galvanometers G1 and G2 of Fig. 1, to effect operation of units 4, 5, and other similar units when more than two are utilized, at points of the input-output curves having the same slope as that of the master unit #6. Simultaneously, the contacts t4, t5 and t6 are moved along uniform resistances U4, U5 and U6 effecting summation of effects representative of the total load to control unit #6. The control systems jointly effect operation of the group at a substantially constant load, and at maximum group efficiency, for varying conditions of power demand imposed upon line L.

Depending upon the number of units in operation, for example, the total load may be set to a desired value simply by adjusting contact t7 along resistance U7, which may be calibrated, if desired. The units, under the control of the master unit #6 such as #4 or #5, may be of any desired number. To vary the number of units in service insofar as the control system is concerned, for example, to cut in or out unit #4, it is only necessary to manipulate switch D included in feeder circuit F4 to make or break the output circuit of alternator A4 and switch E included in conductor 2 to make or break the circuit of galvanometer G4. No change in or substitution of control circuit elements associated with the other units is necessary as the re-distribution of load between the units in service is effected automatically solely in accordance with the individual characteristic of the units, independently of any inter-relation of characteristics.

From the foregoing it will be understood that the master-unit of a group may be controlled by a line condition, as frequency, load demand, power factor, etc., and that other units of the group are caused to operate under conditions determined by the master-unit and effecting a maximum operating efficiency of the group.

To a single line L may be connected a plurality of groups, for example, a frequency-controlled group, as shown in Fig. 1, and a plurality of load-controlled groups, as shown in Fig. 2. The generators A1, A2 may be either D. C. or A. C. machines and the units including the generators A1, A2, etc. may comprise motor-generator sets, rotary convertors, frequency-changing motor-generator combinations, etc. Further in a single network any or all of the types mentioned may be included to supply energy thereto.

Referring to Fig. 3, each of the galvanometers G1 to G6, is provided with a movable coil structure 16 to which is affixed a pointer 17 normally positioned between pivoted levers 18, 19. An oscillatable member 20 having a downwardly projecting arm 21, is periodically engaged by a cam 22 mounted upon shaft 23 driven at a substantially constant speed by motor 24. A second cam 22' mounted on shaft 23 engages a pivoted member 25 at the time of or before upward movement of member 20 to move the friction member 26 fastened to the ends of an arm 27 pivoted at the lower end of member 25 out of engagement with a fixed plate 28. Upon movement of pointer 17 from its normal, central position to the right, for example, during upward movement of member 20, it is clamped between the end of pivoted lever 18 and plate 20A secured to member 20 effecting rotation of the lever 18 in a clockwise direction. The lower end of the lever engages an abutment 29 mounted on a plate 30 to which arm 27 is secured to effect rotation of arm 27 in a clockwise direction. Thereafter as cam 22' continues to rotate, the friction members 26 engage plate 28 to hold arm 27 in its new position. During continued rotation of shaft 23, the left hand end of arm 27 is engaged by cam 31 to restore arm 27 to its original, horizontal position, against the frictional resistance between shoes 26 and plate 28. Similarly, upon deflection of pointer 17 to the left arm 27 is rotated in a counter-clockwise direction to a position from which it is returned to its original position by cam 32. Cams 31 and 32 of conducting material are insulated from shaft 23 and are in continuous contact with brushes 33 and 34, respectively. Arm 27 in circuit with the brush 35 comprises the movable element of a reversing switch, the co-operating contacts of which adapted to be alternatively engaged by arm 27 are comprised by cams 31 and 32. In unit #1 for example, arm 27 corresponds to switch arm 3 and cams 31 and 32 correspond to fixed contacts 4 and 4'. When control mechanism of this character is utilized, as the deflection of the galvanometer is proportional, for example, to the difference in slope of the input-output curves of generating units #1 and #2, the periods of energization of motors M1 and M2 are proportional to the difference between the relative rates of change of input and output of the units.

Figure 4:
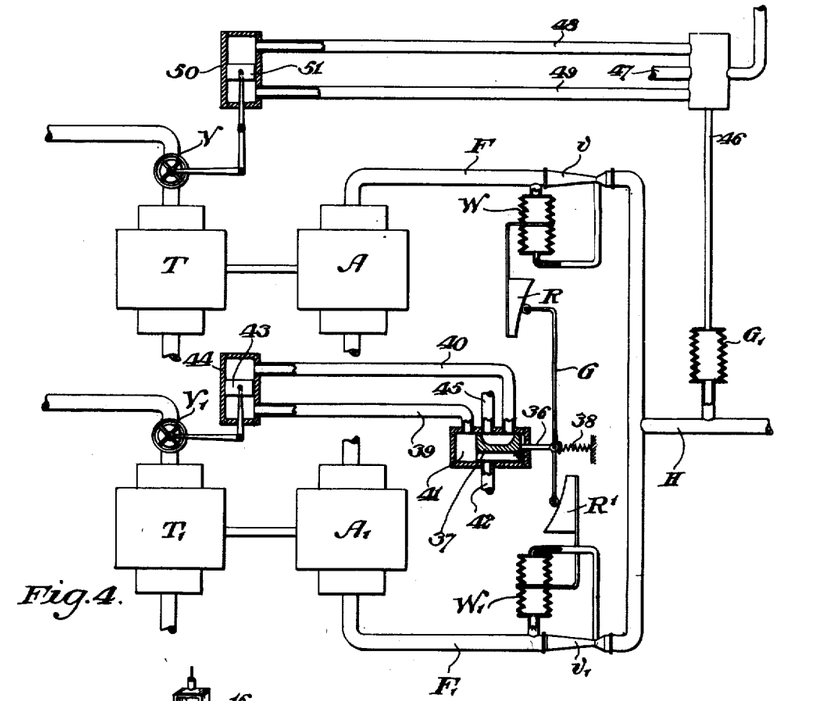
Fig. 4 is a diagrammatic view of a non-electrical system in which my invention is utilized.

In some of its aspects my invention is not limited to use with electrical generating systems, nor is it essential that the control system involve potentiometer resistances, or other circuit elements. Referring to Fig. 4, in which elements of a non-electrical system are identified by characters clearly establishing their analogy to those of the systems described, the prime movers T and T1 are connected to and drive pumps A and A1 respectively to supply fluid to the main line H. In feeder pipes F and F1 there are included Venturi tubes V and V1, associated with flow-meters W and W1, with the movable structures of which are associated the cams R and R1 the shape of each of which is determined by the slope-output curve of the associated pump and prime-mover. At the ends of a lever G cam followers or rollers engage the faces of cams R and R1, and to the lever intermediate the ends thereof is connected the actuating rod 36 of a slide valve 37 of a well known type. A spring 38 or equivalent biasing means maintains both ends of the floating lever G in continuous engagement with the respective cam faces. When both units are operating at points of their input-output curves having the same slope the slide-valve 37 is in position blocking communication of chamber 41 with pipes 39 and 40. As the relative rate of change of input and output of the combination of prime mover T1 and pump A1 changes with respect to the relative rate of change of input and output of combination prime mover T and pump A, lever G pivots about its upper end effecting communication between chamber 41 and either pipe 40 or 39 to permit pressure of fluid therein supplied by pipe 42 to be applied to one side or the other of a piston 43 disposed in cylinder 44 to effect through any suitable mechanism, change in position of valve V1 in a sense modifying the operation of pump A to change the position of cam R1 as controlled by flow meter W1, ultimately through lever G, to restore slide-valve 37 to its intermediate position. An exhaust or outlet pipe 45 permits escape of fluid displaced by movement of piston 43 from cylinder 44 to atmosphere, for example.

The upper prime-mover, pump combination T and A may be controlled to maintain substantially constant any desired condition of fluid in the main conduit H. For example, to maintain the pressure thereof substantially constant, there is provided a suitable pressure-responsive instrument, as bellows G1, to which is connected the shaft 46 of a slide valve, not shown, movable selectively to permit fluid under pressure to pass from pipe 47 through conduits 48 or 49 into cylinder 50 to effect movement of piston 51 suitably connected to valve V. Upon decrease in pressure resulting from increased demand, for example, valve V, through the control system described, is moved to position admitting greater energy to prime mover T to increase its speed and that of pump A. Meanwhile, the changed output of the pump A has caused displacement of cam R by flow meter W to displace slide-valve 37 in a sense to effect operation of both pumping units at points of their input-output curves having the same slope. When the pressure of fluid in pipe H is of desired value, the valve V is permitted to remain at rest and, in addition, when both units are operating to give maximum group efficiency, valve V1 is also stationary.

What I claim is:

1. A system comprising two or more mechanisms, means adjustable to vary the input of said mechanisms, and means responsive to difference in relative rates of change of input and output of the mechanisms to control said adjustable means.

2. A system comprising two or more energy-supply mechanisms, means adjustable to vary the energy delivered to said mechanisms, and means responsive to difference in relative rates of change of input and output of the mechanisms to control said adjustable means.

3. A system comprising two or more energy-supply mechanisms, means associated with each mechanism to produce an effect representative of the relative rate of change of input and output, and means responsive to the effects jointly to effect operation of the mechanism at points of their input-output curves having the same slope.

4. A system comprising two or more energy-supply mechanisms, means associated with each mechanism and actuated by output energy thereof to produce an effect representative of the relative rate of change of input and output, and means responsive to the effects jointly to control delivery of energy to said mechanism.

5. A system comprising two or more mechanisms, energy-consuming means and energy supply means associated therewith, means responsive to a condition of one of said means to control one of said mechanisms, means associated with each of said means and actuated by interchange of energy therebetween and one of said first named means to produce an effect representative of the relative rate of change of input and output, and means responsive to the effects jointly to effect operation of the other of said mechanisms at points of their input-output curves having the same slope as that of the controlled mechanism.

6. A system comprising two or more mechanisms, means adjustable to vary the input of said mechanisms, a control network comprising resistances, movable contacts co-operating therewith, operating means therefor actuated by energies of respective mechanisms, and means in circuit with said contacts responsive to difference of potential therebetween to control said adjustable means.

7. A system comprising two or more alternators, each driven by an individual prime mover and comprising therewith a unit, means to vary the energy supplied to the prime movers, means producing potentials representative of the relative rates of change of input and output of the respective units, and means responsive to differences in magnitude of said potentials to control said first means.

8. A system comprising two or more energy-supply mechanisms, individual actuating means for each of said mechanisms and comprising therewith a unit, means to vary energy supplied to one of said actuating means in response to change in magnitude of a system condition to maintain a substantially constant desired magnitude of the condition, and means to vary energy supplied to other actuating means to effect operation of the units at points of their input-output curves having the same slope.

9. An electrical system comprising a group of two or more generators, individual prime movers for each of said generators and comprising therewith a unit, means to vary energy supplied to one of said prime movers as the system load varies to maintain the energy supplied by said group of generators substantially constant, and means to vary energy supplied to other prime movers to effect operation of all the units at points of their input-output curves having the same slope.

10. An electrical system comprising a group of two or more units each comprising an alternator and a prime mover therefor, means for producing effects representative of the outputs of said units, means for producing a summation of said effects, means for producing a standard effect representative of a desired total output of said group, and a plurality of means for controlling the individual units responsive to changes of the group load and individual loads to maintain the summation of said effects in balance with said standard effect and to maintain a desired relation between individual effects.

11. An electrical system comprising a group of two or more units each comprising an alternator and a prime mover therefor, means for producing electro-motive forces representative of the outputs of the units, means responsive to the outputs of the units for producing electromotive forces varying in accordance with their slope-output characteristics, means for controlling one of said units in response to changes in the summation of said first electro-motive forces, and means for controlling the other units in response to unbalance of said second electro-motive forces.

12. An electrical system comprising a group of two or more units each comprising an alternator and a prime mover therefor, a potentiometer network comprising a plurality of impedances in series, means for varying the effective voltages produced by said impedances in said network with changes in outputs of said units to produce a summation voltage representative of group load, a second potentiometer network comprising a plurality of impedances in parallel, means for varying the effective voltages produced by said parallel connected impedances with changes in output of said units, and an automatic control system including said network for controlling the units to maintain said summation voltage constant for different system demands and to effect balance of said second voltages at different magnitudes for different system demands.

13. An electrical system comprising a group of two or more units each comprising an alternator and a prime mover therefor, means producing effects representative of the outputs of the individual alternators, means for totalizing the outputs of the alternators, and an automatic control system comprising said totalizing means and said effects-producing means for controlling said units to effect a desired ratio between the total output of the group and the individual output of each unit.

14. An electrical system comprising a group of generating units, means producing effects proportional to the outputs of the individual units, means for summating said effects, means producing a standard effect proportional to the desired group load, and means responsive to unbalance between said standard effect and the summation of said individual effects for controlling at least one of said units to maintain the group load substantially constant.

15. Apparatus for controlling a plurality of prime mover operated electrical generating units, at least one of which has characteristics different from another comprising, in combination, a resistance element for each of said units, electrical circuits, means whereby said resistances control potentials impressed upon said circuits automatically in accordance with a predetermined relation between the characteristics of said units, and means controlled by said circuits for adjusting the power of the units.

16. Apparatus for controlling a prime mover operated electrical generating unit comprising, in combination, operating mechanism for varying the power of the prime mover, means responsive to variations in the power output of said unit, and means controlled by said responsive means to adjust said operating mechanism intermittently automatically upon variations in the power output from a predetermined value to maintain a substantially constant load on said unit.

17. Apparatus for controlling a prime mover operated electrical generating unit comprising, in combination, operating mechanism for varying the power of the prime mover, a watt-meter adapted to indicate the power output of said unit, and means controlled thereby to adjust said operating mechanism to maintain substantially constant load on said unit including a galvanometer and a device controlled thereby for making a series of electrical contacts whereby control impulses may be imparted to said operating mechanism.

18. Apparatus for controlling a prime mover operated electrical generating unit, comprising, in combination, operating mechanism for varying the power of the prime mover, means responsive to variations in the power output of said unit, a pair of resistance elements connected electrically in parallel and having a constant potential impressed upon the terminals thereof, means having a circuit bridged across said resistances and provided with contacts to permit relative adjustment between the same and their respective resistances, means for manually effecting relative adjustment between one of said resistances and its bridged contact, means for effecting relative adjustment between the other of said resistances and its bridged contact by said power responsive means whereby said operating mechanism is automatically adjusted when a difference of potential exists at said bridged contacts thereby varying the power of the unit to effect relative adjustment between the power responsive resistance and its bridged contact until potential at the respective bridged contacts are balanced.

19. The combination set forth in claim 18, further characterized in that said bridged circuit includes a galvanometer and a device controlled thereby for imparting control impulses to said operating mechanism.

20. Apparatus for controlling a plurality of prime mover operated electrical generating units comprising in combination operating mechanism for varying the power of each of the prime movers, watt-meters, one for each of said units, and means controlled by each of said watt-meters for adjusting the operating mechanism of each of said units to maintain a substantially constant load on each unit.

21. Apparatus for controlling a plurality of prime mover operated electrical generating units comprising, in combination, operating mechanism for varying the power of each of the prime movers, watt-meters, one for each of said units and means controlled by each of said watt-meters for adjusting the operating mechanism of each of said units to maintain a substantially constant load on each unit, said means including a master load setter.

22. Apparatus for controlling a plurality of prime mover operated electrical generating units comprising in combination operating mechanism for varying the power of each of the prime movers, watt-meters, one for each of said units and means controlled by each of said watt-meters for adjusting the operating mechanism of each of said units to maintain a substantially constant load on each unit, said means including means common to each of said units for setting a predetermined combined load therefor.

23. Apparatus for controlling a plurality of prime mover operated electrical generating units, each having operating mechanism for varying the power of its respective prime mover, means responsive to the power output of said units, and means controlled thereby to maintain a constant total output and a predetermined distribution of power between said units.

24. The combination of a plurality of generating units disposed to supply power to an electrical system, load-adjusting means for each of said units, load-responsive means acted upon by the total power supplied by all of said units, control means for each of said unit-load adjusting means, and means whereby all of said unit-controlled means are influenced by said load-responsive means, each of said unit-control means having responsive characteristics graded to accord with the efficiency-load characteristics of the associated generating unit.

25. Apparatus for controlling a prime mover operated electrical generating unit comprising, in combination, operating mechanism for varying the power input to the prime mover, means responsive to variations in the power output of said unit, and means controlled by said responsive means to intermittently adjust said operating mechanism and the power input controlled thereby.

26. Apparatus for controlling a prime mover operated electrical generating unit comprising, in combination, operating mechanism for varying the power of the prime mover, a watt-meter adapted to indicate the power output of said unit, and means controlled by said wattmeter to adjust said operating mechanism to maintain substantially constant load on said unit including means for imparting a series of control impulses to said operating mechanism.

27. Apparatus for controlling prime mover operated electrical generating units comprising, in combination, means for setting a predetermined power output on at least one of said units, means whereby additional operation of one or more of the remaining units automatically causes a redistribution of the fixed combined output between all of the units in accordance with a predetermined schedule of operation.

28. Apparatus for controlling prime mover operated electrical generating units comprising, in combination, means for setting a predetermined power output on a plurality of said units, and means whereby when a unit is removed from service the fixed combined output is redistributed between the remaining units automatically in accordance with a predetermined schedule of operation.

29. Apparatus for controlling and operating two or more of several prime mover operated electrical generating units comprising, in combination, means for setting a predetermined combined output, means whereby the load is distributed between at least two of said units to give the fixed combined output, and means whereby when another unit is operated and its output added to the other units the fixed combined load will be redistributed automatically between all of the units in operation.

30. Apparatus for controlling and operating two or more of several prime mover operated electrical generating units comprising, in combination, means for setting a predetermined combined output, means whereby the load is distributed between at least two of said units to give the fixed combined output, and means whereby when a plurality of additional units are operated the combined load will be redistributed automatically between all of the units in operation.

31. Apparatus for controlling at least one of a plurality of prime-mover-operated alternating current generating units jointly supplying current to a system at the frequency thereof, comprising, in combination, operating mechanism for varying the power input to the prime mover of said one of said generating units, means responsive to variations in the power output of said one generating unit, and means controlled by said responsive means intermittently to adjust said operating mechanism and the power input controlled thereby to maintain a substantially constant load on said one of said generating units irrespective of changes of the alternating current frequency of said system.

EDGAR D. DOYLE.

CERTIFICATE OF CORRECTION.

Patent No. 2,054,121.  September 15, 1936.

EDGAR D. DOYLE.

It is hereby certified that error appears in the printed specification of the above numbered patent requiring correction as follows: Page 2, second column, line 19, for the words and comma "Fig. 1a for example," read for example, Fig. 1a; page 4, first column, line 63, after "lever G" insert a comma; and second column, line 62, claim 3, for "mechanism" read mechanisms; page 6, first column, line 70, claim 24, for "responsive" read response; and that the said Letters Patent should be read with these corrections therein that the same may conform to the record of the case in the Patent Office.

Signed and sealed this 23rd day of November, A. D. 1937.

(Seal)

Henry Van Arsdale,
Acting Commissioner of Patents.